United States Patent Office 3,118,913
Patented Jan. 21, 1964

3,118,913
PRODUCTION OF 1,4,5,6,7,8,8-HEPTACHLORO-2,3-EPOXY - 3a,4,7,7a-TETRAHYDRO-4,7-METHANO-INDAN
Arthur W. Carlson, Chicago, Ill., assignor to Velsicol Chemical Corporation, Chicago, Ill., a corporation of Illinois
No Drawing. Filed Feb. 6, 1961, Ser. No. 87,064
6 Claims. (Cl. 260—348.6)

This invention relates to a process for the preparation of a pesticidal composition of matter. More specifically, this invention relates to a novel process for the preparation of the chemical compound 1,4,5,6,7,8,8-heptachloro-2,3-epoxy-3a,4,7,7a-tetrahydro-4,7-methanoindan having a melting point of approximately 159–160° C. This compound is toxic to a wide variety of economically important insects and is useful for the control of such pests.

Until the discovery of the process of this invention, however, the commercial use of this compound for the control of insect pests has been prohibited by the fact that heretofore no commercially feasible process for the production of this compound has been known. It would be obvious to one skilled in the art to attempt to prepare the epoxy compound by treating heptachlor, i.e., 1,4,5,6,7,8,8-heptachloro - 3a,4,7,7a - tetrahydro-4,7-methanoindene, with a peroxy compound such as peracetic acid in the conventional manner for synthesizing organic epoxides. However, it has been found that heptachlor is extraordinarily resistant to oxidation by this process; and indeed repeated attempts with a variety of peroxy compounds under various stringent conditions of time and temperature have produced the epoxy compound only in yields which are less than ten percent. This is not a commercially feasible process, and it is further undesirable in requiring the use of expensive peroxy compounds, which are also dangerous to handle and require the use of special equipment.

It is therefore an object of this invention to provide a method for the preparation of the epoxy compound which is commercially feasible.

It is a further object of this invention to provide a process for the preparation of the epoxy compound in good yield which makes use of readily available commercial starting materials and reagents.

It is another object of this invention to provide a process for the preparation of the epoxy compound which obviates the need for expensive and dangerous reagents as well as the need for special equipment.

Other objects of the present invention relate to the production of certain hydroxy and chlorohydrin intermediates or precursors of the aforesaid epoxy compound.

According to the process of this invention, the epoxy compound can be prepared readily in good yield from the compound 1-bromo-4,5,6,7,8,8-hexachloro-3a,4,7,7a-tetrahydro-4,7-methanoindene, which will be referred to hereinafter as the bromo compound. It is known in the art that the bromo compound can be obtained in substantially quantitative yield by the bromination of 4,5,6,7,8,8 - hexachloro - 3a,4,7,7a - tetrahydro-4,7-methanoindene, which itself can be produced in substantially quantitative yield by the equimolecular, Diels-Alder adduction of the commercial chemicals cyclopentadiene and hexachlorocyclopentadiene. The starting material for the process of this invention can therefore be obtained in substantially quantitative yield from readily available commercial chemicals.

The method of this invention comprises reacting the bromo compound and water, reacting the resulting 1-hydroxy - 4,5,6,7,8,8 - hexachloro - 3a,4,7,7a - tetrahydro-4,7-methanoindene (referred to hereinafter as the hydroxy compound) and a chlorinating agent, and reacting the resulting 1-hydroxy - 2,3,4,5,6,7,8,8 - octachloro-3a,4,7,7a-tetrahydro-4,7-methanoindan (referred to hereinafter as the chlorohydrin compound) and base.

The reactions involved in the process of this invention can be shown schematically as follows.

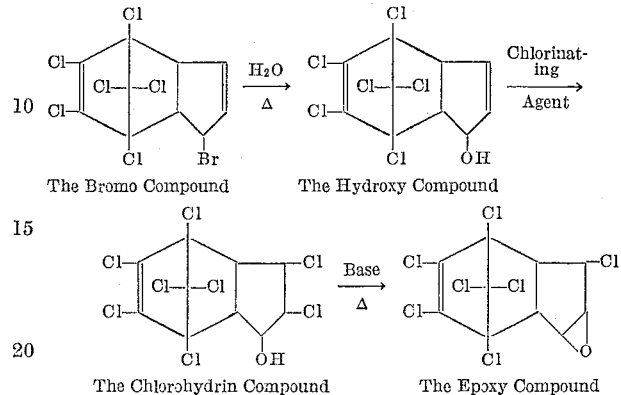

A very important factor in this process is the surprising and unexpected discovery that the bromo compound can be converted to the hydroxy compound in nearly quantitative yield by heating it with water or water-solvent mixtures without the need for additional reagents. Heretofore, the hydroxy compound has been synthesized from the bromo compound either by hydrolysis with aqueous alkaline reagents or by esterification followed by subsequent alcoholysis of the ester.

It has now been found that the bromo compound can be converted to the hydroxy compound by simply reacting it with water. Water alone can be used if efficient agitation apparatus is used to maintain good contact between the water and the water-insoluble bromo compound, or a suitable emulsifying agent of the type known to the art can be used to suspend the bromo compound in the water. The use of such agitation apparatus or emulsifying agents will also be advisable if any multi-phase reaction mixture is encountered, such as may arise, for example, when an inert water-insoluble solvent is used to facilitate the reaction.

Preferred water-solvent mixtures are those in which as much water as possible is present while sufficient solvent is present to effect solution of the solid components. The actual solvent used is not critical, although it is preferred that the solvent be miscible with water. Some examples of typical suitable solvents are dioxane, methyl ethyl ketone, acetone, isopropanol, tetrahydrofuran, the dimethyl ether of diethylene glycol, and the like. Mixtures of such solvents can be used if desired. The amount of water present in the reaction mixture will depend on its miscibility with the solvent chosen, the degree of solubility of the solid components in that solvent, or the provision made for a multi-phase reaction mixture. Generally, the mixture will contain a minimum of about 5% of water by weight based on the bromo compound.

The temperature at which the reaction can be carried out is not critical and will generally be the reflux temperature of the reaction mixture. However, temperatures in the range from about 50° to about 200° C. are preferred. The reaction is often complete within a few hours. For economic operation of this process, it is desirable to recycle the bromine which can be isolated from the reaction mixture (in the form of a bromide salt) after the hydrolysis and neutralization with a base. The hydroxy compound can be isolated by stripping off water and any solvents. The crude residue after the extraction of the bromide is then sufficiently pure for use in the next step of the process of this invention.

The chlorohydrin compound can be prepared by the reaction of the hydroxy compound and a chlorinating agent, if desired in suitable inert solvent or mixture of solvents. The solvent to be used is not critical, but it is preferred to use a somewhat polar solvent. Some typical examples of suitable solvents are chloroform, carbon tetrachloride, nitromethane, trichloroethylene, 1,2-dichloroethane, hexachlorobutadiene, perchloroethylene, sym-tetrachloroethane, and the like. Mixtures of such solvents can also be used if desired. Any suitable chlorinating agent known to the art can be used, but gaseous chlorine is preferred for its ready availability. If desired, chlorination catalysts such as iodine can be used to facilitate the reaction, but their use is not essential to the process of this invention. The temperature at which the chlorination is carried out will depend largely on the reflux temperature of the particular solvent employed and is not critical, but it is preferred to employ temperatures in the range from about normal room temperature to about 150° C. The formation of the chlorohydrin is often complete within a few hours, and the desired product can be isolated in good yield and in a state sufficiently pure for use in the next step of the process by stripping off the solvent.

The final step in the process of this invention comprises the reaction of the chlorohydrin compound and base to cleave a mole of hydrogen chloride from the molecule and thereby form the desired epoxy compound. In this step, the presence of water is not necessary for the reaction but is ordinarily required to put the base into solution. For this reason, many of the solvents described for use in the first step of the process of this invention are also suitable for the present step. While a variety of bases known to those skilled in the art can be employed in this step, such as ammonia, pyridine, sodium carbonate, or potassium carbonate, it is preferred to use strong alkali metal bases such as sodium hydroxide, potassium hydroxide, sodium methoxide, sodium ethoxide or potassium ethoxide. The quantity of base to be used is not critical, but it is preferred to use at least one molecular proportion of base for each molecular proportion of chlorohydrin compound used, and it is most preferred to use an excess of up to about four molecular proportions of base. The reaction can be promoted by heating the components at a temperature which will again be largely dependent on the particular solvent system employed. Temperatures in the range from about 40° to about 250° C. are preferred for convenience. This step, like the first two steps of the process of this invention, will ordinarily be carried out at atmospheric pressure; but sub or superatmospheric pressures can also be used at any stage if desired. When the reaction is complete, the solvent can be stripped and the residue extracted with water to remove inorganic salts. The residue will often be sufficiently pure for use as a pesticide without further purification, but the epoxy compound can be obtained in its pure form by recrystallization from a suitable solvent, chromatography, or other techniques known to the art.

The following examples illustrate the manner in which the starting materials can be obtained and the process of this invention can be carried out. All temperatures given are in degrees centigrade.

EXAMPLE 1

*Preparation of the 1:1 Adduct of Cyclopentadiene and Hexachlorocyclopentadiene*

Hexachlorocyclopentadiene heated to 70°–80° was stirred while an equimolecular quantity of cyclopentadiene was added. A small amount of heptane was then added to maintain a slurry, and the mixture was stirred in a sealed vessel at 70°–80° with external cooling for about 20 minutes. The mixture was then stirred and heated at 150°–160° for about 40 minutes, cooled, and steam distilled. The residue was filtered and dried to give a nearly quantitative yield of crystalline product which was shown by infrared spectrum analysis to contain 96.4% of 4,5,6,7,8,8-hexachloro-3a,4,7,7a-tetrahydro-4,7-methanoindene.

EXAMPLE 2

*Preparation of the Bromo Compound*

The adduct from the previous example (33.89 g.; 0.1 mole), 0.1 g. benzoyl peroxide, and 50 ml. cabon tetrachloride were placed in a 150-ml., three-necked, round-bottomed flask fittted with a heating mantle, mechanical stirrer, internal thermometer, reflux condenser, and a tared 10-ml. burette. Bromine (16.08 g.; 0.100 mole) was weighed into the burette. The mixture in the flask was stirred and heated to a temperature of 70–72°, whereupon the heat was reduced and bromine was added over a period of 30 minutes at a rate of about 0.2 ml. per minute at a temperature of 68–72°. The mixture was stirred for an additional 10 minutes at 70° and transferred to a 500-ml. round-bottomed flask. The solvent was distilled off in vacuo, to leave a residual oil, which was dissolved in 50 ml. hexane. The solvent was again distilled off in vacuo to leave an oil, which was dissolved while still warm in 50 ml. pentane. The pentane mixture was swirled under vacuum without heating, under which conditions the product separated in micro crystals. The white powder was dried thoroughly in a vacuum oven to give 42 g., the theoretical yield, of 1-bromo-4,5,6,7,8,8-hexachloro-3a,4,7,7a-tetrahydro-4,7-methanoindene, melting point 64–66°.

EXAMPLE 3

*Preparation of the Hydroxy Compound*

The bromo compound (75 g.) was dissolved in a mixture of 2.1 liters of dioxane and 1.4 liters of water in a 5-liter, round-bottomed flask fitted with a heating mantle and reflux condenser. The solution was refluxed for 40 hrs., cooled, treated with 7.2 g. of sodium hydroxide, and reduced in vacuo to a moist solid residue. The residue was taken up in 300 ml. ether, washed several times with water, and the ether evaporated. The residue was then refluxed with 100 ml. hexane, cooled to room temperature, and stirred occasionally for one hour. The resulting slurry was filtered, and the solid was washed with 100 ml. of pentane and dried to give 57.1 g. (90% of theory) of 1-hydroxy-4,5,6,7,8,8-hexachloro-3a,4,7,7a-tetrahydro-4,7-methanoindene, M.P. 195–200°. When recrystallized from hexane, the pure hydroxy compound melts at 199–201°.

EXAMPLE 4

*Preparation of the Chlorohydrin Compound*

The hydroxy compound (25.0 g.) was weighed into a 1-liter, round-bottomed flask and dissolved in 300 ml. of chloroform by warming and cooling again to room temperature. A 0.43 molar solution (175 ml.) of chlorine in carbon tetrachloride was then added by burette while a solution of 0.20 g. iodine in 30 ml. of carbon tetrachloride was added simultaneously. The flask was sealed and covered with aluminum foil and allowed to stand at room temperature for a total of 115 hours. An additional 10 millimoles of $Cl_2$ in 20 ml. $CCl_4$ was added after 90 hours. At this time, an aliquot portion was removed and analyzed by its infrared spectrum. It was found that practically no hydroxy compound remained and that a yield of approximately 90% of 1-hydroxy-2,3,4,5,6,7,8,8-octachloro-3a,4,7,7a-tetrahydro- 4,7 - methanoindan was present.

The solvent was stripped from the solution, and the residue was dissolved in pentane and chromatographed on a Florex XXS column (eluated with pentane and ether) to separate the crystalline components. When recrystallized from hexane, the chlorohydrin compound had a melting point of 109.5–112°.

EXAMPLE 5

*Preparation of the Epoxy Compound*

The chlorohydrin compound (3.07 g.) was dissolved in 180 ml. of pure dioxane in a 500-ml., round-bottomed flask and treated with a solution of 3 g. of KOH in 60 ml. water. The solution was refluxed for 2 hours and then reduced to half its volume. The solution was treated with 500 ml. of pentane and 200 ml. of sodium sulfate solution (acidified with HCl). The pentane solution and combined pentane extracts (total of 1.7 l. pentane) of the aqueous solution were reduced to give 2.1 g. of solid residue, which was taken up in 200 ml. of 1:20 ether-pentane and chromatographed on 100 g. of Florex XXS, eluated with 1 l. or the ether-pentane mixture. The eluates were reduced to dryness to give 1.78 g. of solid product, which was analyzed by its infrared spectrum. A total yield of about 80% of theory of the epoxy compound was obtained. The product was recrystallized from pentane to give pure 1,4,5,6,7,8,8-heptachloro-2,3-epoxy-3a,4,7,7a-tetrahydro-4,7-methanoindan, M.P. 157–158°. Mixed melt with authentic sample, M.P. 159–160, was 159–159.5°.

EXAMPLE 6

*Conversion of the Bromo Compound to the Epoxy Compound Without Purification of Intermediates*

The bromo compound (0.25 mole) is placed with 500 ml. of a solution consisting of 5% by volume of water in 95% acetone in a 1-liter flask, and the solution is heated at 50° until an infrared scan taken on an aliquot portion of the reaction mixture indicates that the conversion to the hydroxy compound is substantially complete. The cooled solution is then neutralized with 10% NaOH solution, and the solvents are removed in vacuo. The residue is extracted several times with water and dried. The crude product is taken up in 500 ml. of nitrobenzene, and the mixture is stirred and heated at about 100° while chlorine gas is bubbled through the mixture. When an infrared spectrum analysis reveals that no more chlorohydrin compound is being formed, the solvent is stripped from the mixture in vacuo. Alternately, the solvent can be removed by steam-distillation.

The residue is taken up in 500 ml. of methyl ethyl ketone and treated with a solution of potassium hydroxide (1.00 mole) in 100 cc. water. The mixture is stirred vigorously and heated at a temperature of 40° until it is shown by infrared spectrum analysis that no more chlorohydrin compound remains. The reaction mixture is then cooled and neutralized with dilute HCl. The solvents are stripped in vacuo, and the residue is washed several times with water and dried. The resulting residue will contain the desired epoxy compound in good yield and can be incorporated directly into pesticidal formulations without further purification.

EXAMPLE 7

*Preparation of the Epoxy Compound From the Bromo Compound at Elevated Temperatures*

The bromo compound (0.25 mole) is heated with 500 ml. of water in a steel bomb fitted for vigorous agitation and sufficient in capacity and safety strength to withstand heating the mixture at a temperature of 200° for 2 hours. The bomb is then cooled, and the contents are neutralized with 10% KOH solution. The solid is filtered, washed several times with water, and dried.

The crude product is taken up in 400 ml. carbon tetrachloride and placed in a bomb with a solution of chlorine (0.30 mole) in 100 ml. CCl₄. The sealed bomb is heated for 1 hour at 150° and then cooled. The solvent is stripped from the contents of the bomb, and the residue is taken up in 500 cc. dimethylether of diethylene glycol.

The dimethylether of diethylene glycol solution is treated with a solution of sodium hydroxide (0.25 mole) in 50 cc. water, and the mixture is placed in a bomb and heated at 250° for 2 hours. The contents from the cooled bomb are then neutralized with dilute HCl, and the mixture is reduced to dryness in vacuo. The residue is extracted several times with water and dried to give a product containing the desired epoxy compound in a form suitable for pesticidal use.

I claim:

1. The method for the preparation of 1,4,5,6,7,8,8-heptachloro - 2,3 - epoxy - 3a,4,7,7a - tetrahydro-4,7 - methanoindan having a melting point of approximately 159°–160° C. which comprises contacting 1-bromo-4,5,6,7,8,8-hexachloro - 3a,4,7,7a - tetrahydro - 4,7 - methanoindene and water at a temperature of from about 50° to about 200° C.; contacting the resulting 1-hydroxy-4,5,6,7,8,8 - hexachloro - 3a,4,7,7a - tetrahydro - 4,7 - methanoindene and a chlorinating agent at a temperature from about normal room temperature to about 150° C.; and contacting the resulting 1-hydroxy-2,3,4,5,6,7,8,8-octachloro - 3a,4,7,7a - tetrahydro - 4,7 - methanoindan and from about one to about four moles of a base for each mole of 1-hydroxy-2,3,4,5,6,7,8,8-octachloro-3a,4,7,7a-tetrahydro-4,7-methanoindan at a temperature from about 40° to about 250° C. to form the desired 1,4,5,6,7,8,8-heptachloro - 2,3 - epoxy - 3a,4,7,7a - tetrahydro - 4,7-methanoindan.

2. The method for the preparation of 1,4,5,6,7,8,8-heptachloro - 2,3 - epoxy - 3a,4,7,7a - tetrahydro - 4,7 - methanoindan having a melting point of approximately 159°–160° C. which comprises contacting 1-bromo-4,5,6,7,8,8 - hexachloro - 3a,4,7,7a - tetrahydro - 4,7 - methanoindene and at least 5% by weight of water based on the 1 - bromo - 4,5,6,7,8,8 - hexachloro - 3a,4,7,7a - tetrahydro-4,7-methanoindene employed in an inert solvent; contacting the resulting 1-hydroxy-4,5,6,7,8,8-hexachloro-3a,4,7,7a-tetrahydro-4,7-methanoindene and chlorine in an inert solvent; and contacting the resulting 1-hydroxy-2,3,4,5,6,7,8 - octachloro - 3a,4,7,7a - tetrahydro - 4,7-methanoindan and a strong alkali metal base in an inert solvent to form the desired 1,4,5,6,7,8,8-heptachloro-2,3-epoxy-3a,4,7,7a-tetrahydro-4,7-methanoindan.

3. The method for the preparation of 1,4,5,6,7,8,8-heptachloro - 2,3 - epoxy - 3a,4,7,7a - tetrahydro - 4,7-methanoindan having a melting point of approximately 159°–160° C., which comprises contacting 1-bromo-4,5,6,7,8,8 - hexachloro - 3a,4,7,7a - tetrahydro - 4,7 - methanoindene and at least 5% by weight of water, based on the 1 - bromo - 4,5,6,7,8,8 - hexachloro - 3a,4,7,7a - tetrahydro-4,7-methanoindene, in an inert solvent at a temperature of from about 50° to about 200° C.; contacting the resulting 1 - hydroxy - 4,5,6,7,8,8 - hexachloro - 3a,4,7,7a-tetrahydro-4,7-methanoindene and chlorine in an inert solvent at a temperature from about normal room temperature to about 150° C.; and contacting the resulting 1 - hydroxy - 2,3,4,5,6,7,8,8 - octachloro - 3a,4,7,7a - tetrahydro-4,7-methanoindan and from about one to about four moles of a strong alkali metal base for each mole of 2,3,4,5,6,7,8,8 - octachloro - 3a,4,7,7a - tetrahydro - 4,7-methanoindan in an inert solvent at a temperature of from about 40° to about 250° C. to form the desired 1,4,5,6,7,8,8 - heptachloro - 2,3 - epoxy - 3a,4,7,7a - tetrahydro-4,7-methanoindan.

4. The method for the preparation of 1,4,5,6,7,8,8-heptachloro - 2,3 - epoxy - 3a,4,7,7a - tetrahydro - 4,7 - methanoindan having a melting point of approximately 159°–160° C., which comprises contacting 1-bromo-4,5,6,7,8,8 - hexachloro - 3a,4,7,7a - tetrahydro - 4,7 - methanoindene and water; contacting the resulting 1-hydroxy-4,5,6,7,8,8 - hexachloro - 3a,4,7,7a - tetrahydro - 4,7 - methanoindene and chlorine in an inert solvent at a temperature from about normal room temperature to about 150° C.; and contacting the resulting 1-hydroxy-2,3,4,5,6,7,8,8 - octachloro - 3a,4,7,7a - tetrahydro - 4,7 - methanoindan and a base to form the desired 1,4,5,6,7,8,8-heptachloro - 2,3 - epoxy - 3a,4,7,7a - tetrahydro - 4,7 - methanoindan.

5. The method for the preparation of 1,4,5,6,7,8,8-heptachloro - 2,3 - epoxy - 3a,4,7,7a - tetrahydro - 4,7-methanoindan having a melting point of approximately 159°–160° C., which comprises contacting 1-bromo-4,5,6,7,8,8 - hexachloro - 3a,4,7,7a -tetrahydro - 4,7 - methanoindene and water; contacting the resulting 1-hydroxy-4,5,6,7,8,8 - hexachloro - 3a,4,7,7a - tetrahydro - 4,7 - methanoindene and a chlorinating agent; and contacting the resulting 1 - hydroxy - 2,3,4,5,6,7,8,8 - octachloro - 3a,4,7,7a-tetrahydro-4,7-methanoindan and from about one to about four moles of a strong alkali metal base for each mole of 1-hydroxy-2,3,4,5,6,7,8,8-octachloro-3a,4,7,7a-tetrahydro-4,7-methanoindan employed in an inert solvent at a temperature of from about 40° to about 250° C., to form the desired 1,4,5,6,7,8,8-heptachloro-2,3-epoxy-3a,4,7,7a-tetrahydro-4,7-methanoindan.

6. The method for the preparation of 1,4,5,6,7,8,8-heptachloro - 2,3 - epoxy - 3a,4,7,7a - tetrahydro - 4,7 - methanoindan having a melting point of approximately 159°–160° C., which comprises contacting 1-bromo-4,5,6,7,8,8 - hexachloro - 3a,4,7,7a - tetrahydro - 4,7 - methanoindene and water; contacting the resulting 1-hydroxy-4,5,6,7,8,8 - hexachloro - 3a,4,7,7a - tetrahydro - 4,7 - methanoindene and chlorine in an inert solvent at a temperature from about room temperature to about 150° C.; and contacting the resulting 1-hydroxy-2,3,4,5,6,7,8,8 - octachloro - 3a,4,7,7a - tetrahydro - 4,7 - methanoindan and from about one to about four moles of a strong alkali metal base for each mole of 1-hydroxy-2,3,4,5,6,7,8,8 - octachloro - 3a,4,7,7a - tetrahydro - 4,7 - methanoindan employed in an inert solvent at a temperature of from about 40° to about 250° C., to form the desired 1,4,5,6,7,8,8 - heptachloro - 2,3 - epoxy - 3a,4,7,7a - tetrahydro-4,7-methanoindan.

References Cited in the file of this patent

UNITED STATES PATENTS

| | | |
|---|---|---|
| 2,528,656 | Herzfeld et al. | Nov. 7, 1950 |
| 2,662,922 | Kleiman et al. | Dec. 15, 1953 |
| 2,750,397 | Goldman et al. | June 12, 1956 |
| 2,771,470 | Mark | Nov. 20, 1956 |
| 2,902,495 | Webb | Sept. 1, 1959 |

FOREIGN PATENTS

| | | |
|---|---|---|
| 714,869 | Great Britain | Sept. 1, 1954 |

OTHER REFERENCES

Richter: "Textbook of Organic Chemistry," pages 157, 161, J. Wiley, 1952.

Roberts: Chem. and Ind., page 112, Feb. 1, 1958.